Sept. 19, 1961     G. O. McCLURG ET AL     3,001,130
ECCENTRICITY TESTER
Filed Aug. 21, 1958     2 Sheets-Sheet 1
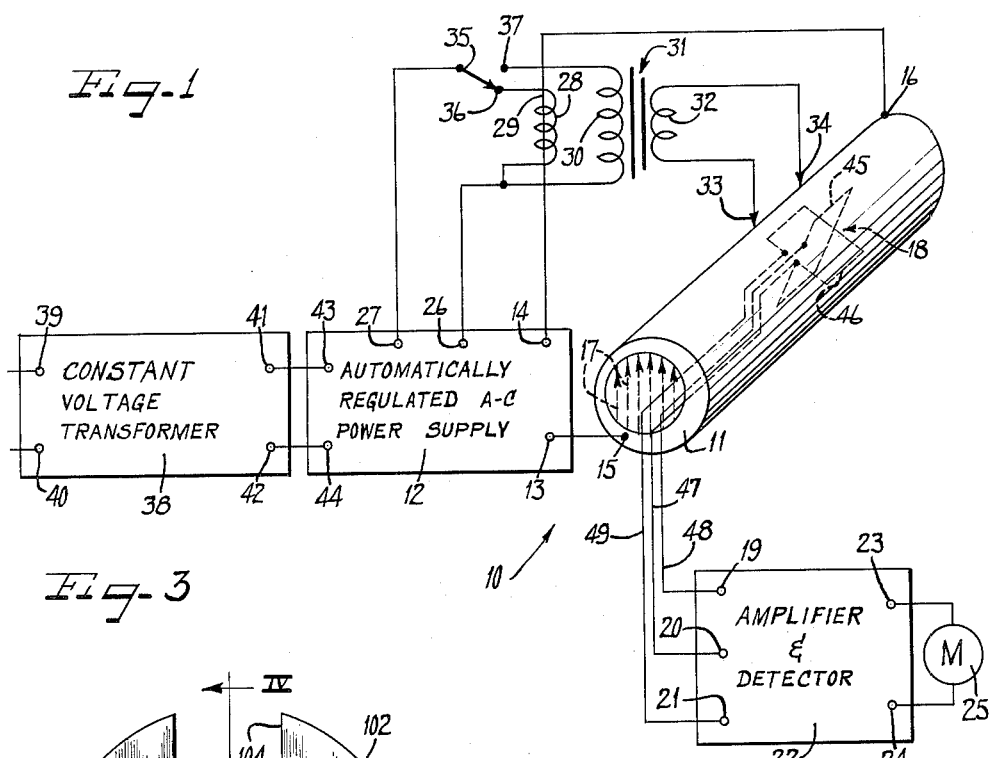
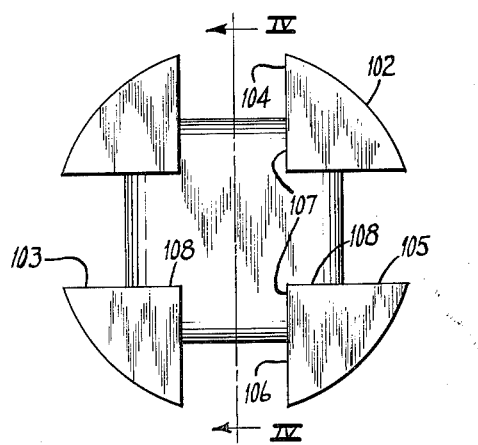
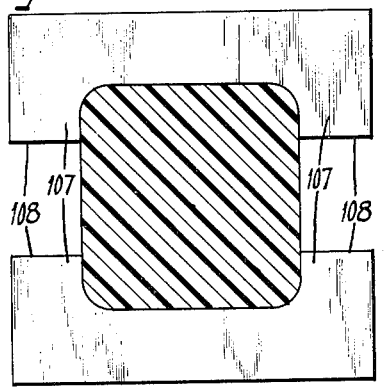
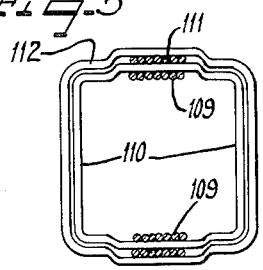
Inventors
Glenn O. McClurg
John O. Brown
Attys

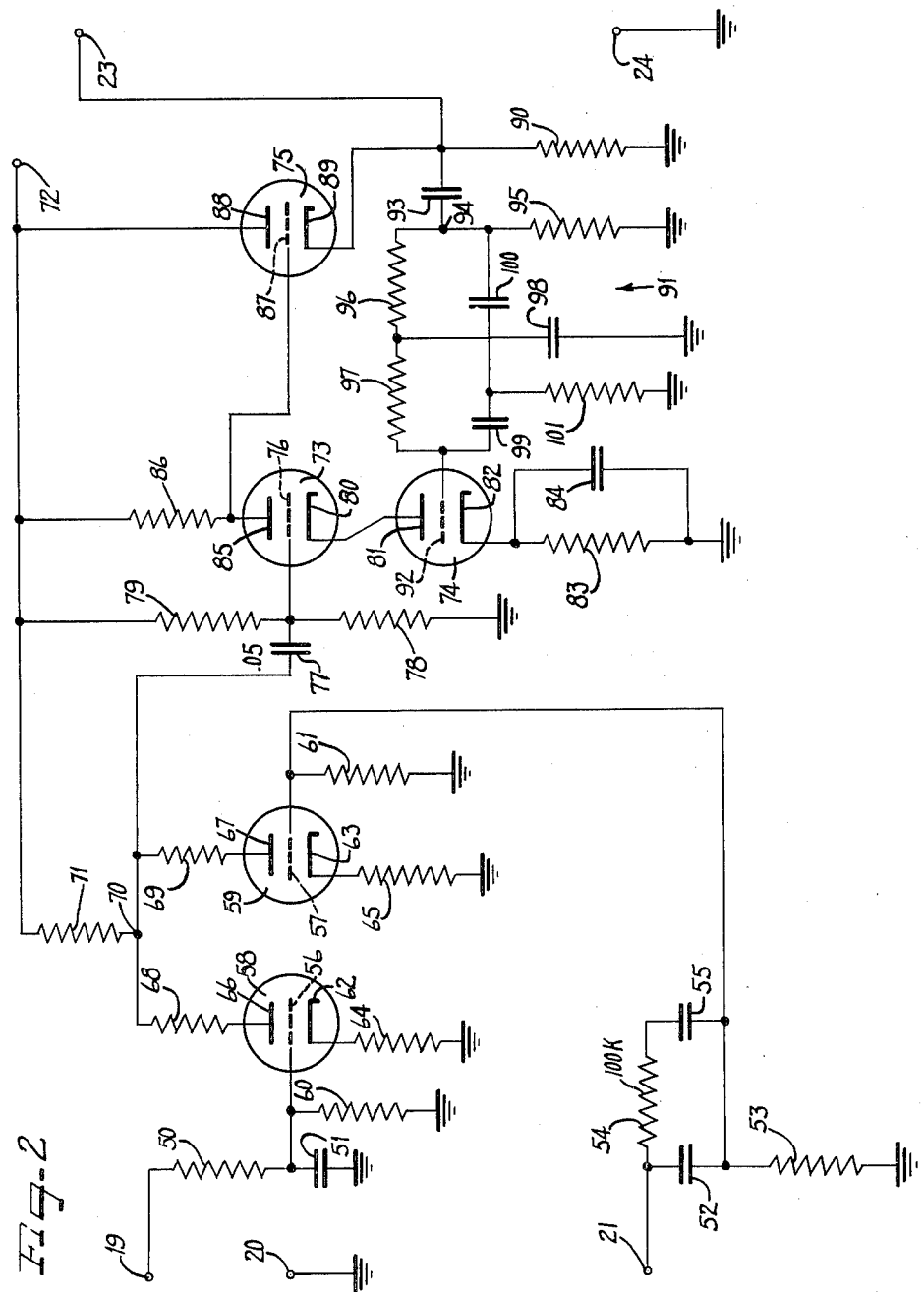

United States Patent Office 3,001,130
Patented Sept. 19, 1961

3,001,130
ECCENTRICITY TESTER
Glenn O. McClurg, Evanston, and John O. Brown, Rolling Meadows, Ill., assignors to Magnaflux Corporation, Chicago, Ill., a corporation of Delaware
Filed Aug. 21, 1958, Ser. No. 756,352
6 Claims. (Cl. 324—34)

This invention was evolved with the object of providing a system for accurately measuring the eccentricity of pipes or tubes.

According to this invention, a current is passed longitudinally through a pipe or tube, and a field-measuring probe is disposed within the pipe or tube to measure the field in a transverse direction. It has been found that if the pipe or tube is eccentric, a uniform magnetic field is produced there within by longitudinal current flow therethrough, so that the field measured by the probe is a measure of eccentricity. It has also been found that the field is directly proportional to the distance between the axes of curvature of the inner and outer cylindrical surfaces, which with other factors can be used as a measure of the amount of eccentricity. Thus a quantitative indication of eccentricity can be obtained.

An important feature of the invention is in the use of alternating current which it is found produces a measurable field within an eccentric tube in the same way that a direct current produces such a field, and also reduces errors produced by stray fields. In additon, it is possible to use much simpler pick-up devices, and to obtain other advantages that will be discussed hereinafter.

Another important feature is in the automatic regulation of the power supply used to supply current to the tube, to increase the accuracy of measurement. It is found that the field within the tube will vary not only with variations in eccentricity, but will also vary with variations in the internal and external diameters of the tube, variations in the length of the tube, variations in the conductivity of the tube, variations in contact resistances of the power cables, heating of the cables, and variations in power line voltage. According to this invention, the voltage across a portion of the circuit is measured and is used to automatically control the current supply in a manner to greatly reduce the effect of variables and increase the accuracy of measurement.

A further important feature is in the provision of a probe in the form of a pair of fixed pick-up coils arranged with their axes at right angles to each other and in a plane at right angles to the axes of curvature of the tube surfaces. By using this form of probe, it is found possible to measure the amount of eccentricity without moving or adjusting the position of the coils.

Still another feature is in electronic circuitry used to develop an output from the pair of pick-up coils which is directly proportional to eccentricity.

A still further feature is in the provision of means to minimize the effect of harmonics, by which is found possible to greatly improve the accuracy of measurement.

This invention contemplates other objects, features and advantages which will become more fully apparent from the following detailed description taken in conjunction with the accompanying drawings which illustrate a preferred embodiment and in which:

FIGURE 1 is a schematic diagram of an eccentricity measuring system constructed according to the principles of this invention;

FIGURE 2 is a circuit diagram of an amplifier and detector used in the system of FIGURE 1;

FIGURE 3 is an end elevational view of a coil form usable in the practice of the invention;

FIGURE 4 is a cross-sectional view taken along line IV—IV of FIGURE 3; and

FIGURE 5 is a diagrammatic illustration of one preferred coil-winding method.

Reference numeral 10 generally designates a measuring system constructed acording to the principles of this invention, which may be used to measure the eccentricity of a pipe or tube 11.

The system 10 comprises an automatically regulated power supply 12 having output terminals 13 and 14 connected to points 15 and 16 at opposite ends of the pipe or tube 11, so as to conduct current longitudinally through the pipe or tube. The connections at points 15 and 16 may be made by clamping copper braid or the like around each end of the tube. It is found that with any eccentricity of the pipe or tube, a magnetic field will be produced therein such as diagrammatically illustrated by dotted lines 17. At points far enough from the connection points 15 and 16 to eliminate "end effect," this field is substantially uniform and at right angles to a plane through the axes of the inner and outer surfaces of the tube. It is also found that the magnitude of the field is directly proportional to the distance between the axes of the inner and outer surfaces, so that by measuring the field in a direction transverse to a plane through the axes of the inner and outer surfaces, one can obtain a quantitative measurement of the magnitude of the eccentricity.

To measure the field within the rod or tube 11, a coil assembly generally designated by reference numeral 18 is connected to input terminals 19, 20 and 21 of an amplifier and detector circuit 22 having output terminals 23 and 24 connected to a meter 25, or other indicating device.

The power supply 12 may be a direct current supply, if desired. It has been discovered, however, that an alternating current supply produces a field within the rod or tube in response to eccentricity in the same fashion as a direct current field, and in addition has distinct advantages over a direct current field. In particular, the use of an alternating current supply reduces errors that might otherwise be produced by direct current fields, and also simplifies the field-measuring system.

Another important feature of the invention is in the provision of means for automatically regulating the current supply in response to a voltage derived in response to current flow through the tube. In particular, the supply 12 is adapted to be automatically regulated in response to changes in a signal applied to a pair of terminals 26 and 27. Terminal 26 is connected to one terminal of a current transformer coil 28 wound about a conductor 29 in circuit between terminals 14 and 16. Terminal 26 is also connected to one terminal of a secondary winding 30 of a transformer 31 having a primary winding 32 connected to contacts 33 and 34 arranged to engage longitudinally spaced points of the rod or tube 11. Terminal 27 is connected to a movable selector switch contact 35 arranged to engage either of two contacts 36 and 37 respectively connected to the other terminal of the current transformer coil 28 and the other terminal of the transformer secondary winding 30.

With the movable contact 35 in the position as illustrated in engagement with contact 36, the circuit functions to maintain substantially constant current flow. For example, if current flow should tend to increase, the voltage developed across the current transformer coil 28 will increase to increase the voltage applied to terminals 26 and 27 of the supply 12. The supply is so arranged that such an increase in voltage applied to terminals 26 and 27 will reduce the current output thereof.

With the selector switch contact 35 connected to the terminal 37, the circuit functions to maintain a substantially constant voltage drop per unit length along the tube 11. For example, if the voltage between contacts 33 and 34 should tend to increase, the voltage developed across secondary winding 30 will be increased, to increase the voltage applied to terminals 26 and 27, and thus reduce the current output of the supply 12.

In either position of the selector switch contact 35, compensation is obtained for variations in the contact resistances of power cables, heating of the cables, the conductivity of the tube, power line voltage variations, and the internal and external diameters and length of the tube. It is found that with either system, the maximum error can be greatly reduced.

In addition, each system of control has advantages over the other, depending upon the type of measurement desired. In some cases, it is found desirable to measure eccentricity in terms of the spacing between the axes of the inner and outer surfaces divided by the difference between the radii of the inner and outer surfaces. In this case, the constant current control system is found to produce the least error, with the movable switch contact 35 being connected to the contact 36.

In other cases, it is desirable to measure eccentricity in terms of the distance between the axes of the inside and outside surfaces, irrespective of variations in the radii of the inside and outside surfaces. In this case, it is found that the least error is obtained by maintaining the voltage drop per unit length along the tube constant, and hence the movable selector switch contact 35 is connected to the contact 37.

It should be noted that the transformer 31 is not necessarily required, and it is possible to directly connect contacts 33 and 34 to terminals 26 and 27 of the power supply, depending, of course, upon the sensitivity of regulation of the supply. Also, the current transformer is not necessarily required, and the current signal may be developed across a fixed series resistance. In this connection, it is noteworthy that although the alternating current supply is preferred, it is possible to use a direct current supply and use automatic regulation either of current or of the voltage drop per unit length along the tube 11. When using direct current, it would not, of course, be possible to use transformers.

The automatically regulated power supply may be of any of various types known in the art which are adapted to supply a high current, and for that reason, it is not illustrated in detail. An induction voltage regulator is found to be preferable to a saturable reactor type of automatically regulated supply, in that the induction voltage regulator type has substantially no harmonic distortion, whereas the harmonic distortion of a saturable reactor type is very bad. However, the induction voltage regulator does not have a rapid response speed, which may be a handicap where there are rapid changes in the supply line voltage, as is quite often the case. In such cases, a constant voltage transformer 38 may be provided having input terminals 39 and 40 for connection to a power supply line, and output terminals 41 and 42 respectively connected to input terminals 43 and 44 of the supply. The constant voltage transformer may maintain the voltage applied to terminals 43 and 44 constant despite rapid variations in the voltage applied to terminals 39 and 40. With the supply 12 being in the form of an induction voltage regulator, satisfactory operation is then achieved even though the induction voltage regulator may not have a rapid response speed.

With respect to the test coil assembly 18, it is possible with an alternating current supply, to use a loop coil to develop an A.C. voltage proportional to the maximum rate of change in linking flux produced by the applied alternating current. On the other hand, with a direct current supply, it would be necessary to use a device capable of detecting a constant field. For example, a second harmonic type of flux detector may be used, preferably of a type such as disclosed in Foerster Patent No. 2,758,276, issued August 7, 1956.

To accurately measure eccentricity, it is necessary to measure the maximum field within the pipe or tube. If a single flux-measuring device were used, it would be necessary to physically rotate the device within the pipe or tube until a maximum indication was obtained. Such may be a difficult and time-consuming operation, not always productive of the most accurate results.

According to a further feature of the invention, the test coil assembly 18 comprises a pair of flux-measuring devices on mutually perpendicular axes, and means are provided for determining from the outputs of the devices, the maximum flux existing within the pipe or tube, without requiring rotation of the devices. The flux-measuring devices are preferably in the form of a pair of loop coils 45 and 46 as diagrammatically illustrated in FIGURE 1, the use of loop coils being possible with alternating current excitation as explained above. One terminal of each coil is connected through a conductor 47 to the input terminal 20 of the amplifier and detector 22, the other terminals of the coils 45 and 46 being respectively connected through conductors 48 and 49 to the input terminals 19 and 21.

With the use of two field measuring devices, the field within the tube 11 can be resolved into two components, and the magnitude of the field can be determined by determining the square root of the sum of the squares of the two components. In the illustrated system, one of the components is perpendicular to the plane of coil 45 and the other is perpendicular to the plane of coil 46.

It will be apparent that two signals so obtained may be independently measured and the magnitude of the field may then be determined by mathematically taking the square root of the sum of the squares of such signals.

According to another feature of the invention, a circuit is provided which will produce an output signal proportional to the square root of the sum of the squares of the signals from the two flux-measuring coils. This circuit might comprise two separate squaring circuits, followed by an adding circuit, and then followed by a circuit for taking the square root. Such circuits are, however, quite involved. This invention provides a system for producing the same results, but in a very simple, reliable and accurate manner.

The circuit of this invention operates on the fact that if two sinusoidal wave forms having the same frequency and 90° out of time phase are added in a linear circuit, the resultant sine wave will have an amplitude equal to the square root of the sum of the squares of the amplitudes of the two component wave forms.

Referring to FIGURE 2, terminal 19 (which is connected to one terminal of coil 45) is connected through a resistor 50 and a capacitor 51 to ground, the terminal 20, which is connected to terminals of both coils, being also connected to ground. Terminal 21 (which is connected to coil 46) is connected through a capacitor 52 and a resistor 53 to ground. With this circuit, and with the resistances of resistors 50 and 53 being respectively equal to the capacitive reactances of capacitors 51 and 52 at the frequency of operation, output voltages are developed across capacitor 51 and resistor 53 which are substantially 90° out of time phase. It is found however, in practice that due to stray capacitances, the signals may not be precisely 90° out of phase, and an additional compensation may be incorporated in one or the other of the circuits. For example, in a particular circuit arrangement, it was found that exact compensation could be obtained by connecting a resistor 54 and a capacitor 55 in series across the capacitor 52.

The signals developed across capacitor 51 and resistor 53 are respectively applied to the control grids 56 and 57 of a pair of triodes 58 and 59, the control grids 56 and 57 being connected through resistors 60 and 61 to ground. The triodes 58 and 59 have cathodes 62 and 63 connected through resistors 64 and 65 to ground, and plates or anodes 66 and 67 respectively connected through resistors 68 and 69 to a circuit point 70 which is connected through a resistor 71 to a terminal 72 arranged to be connected to a power supply terminal at a relatively high positive potential relative to ground.

With this circuit, there is developed across the resistor 71 a signal which is proportional to the square root of the sum of the squares of the input signals. This signal is applied to an amplifying and filtering circuit which comprises three triodes 73, 74 and 75. The triode 73 has a control grid 76 connected through a capacitor 77 to the circuit point 70 and also through resistors 78 and 79 to ground and the positive power supply terminal 72. A cathode 80 of the triode 73 is connected to the plate or anode 81 of the triode 74, the triode 74 having a cathode 82 connected to ground through the parallel combination of a resistor 83 and a capacitor 84.

The triode 73 has a plate or anode 85 connected through a resistor 86 to the positive power supply terminal 72 and connected directly to control grid 87 of the triode 75. The triode 75 is operated as a cathode-follower with its plate or anode 88 being connected directly to the positive power supply terminal 72 and with its cathode 89 being connected through a resistor 90 to ground. The cathode 89 is connected to the output terminal 23, the other output terminal 24 being connected to ground.

The cathode 89 is additionally connected through a filter network 91 to the control grid 92 of the triode 74.

The network 91 comprises a capacitor 93 connected between cathode 89 and a circuit point 94, a resistor 95 connected between circuit point 94 and ground, and a pair of T networks connected between circuit point 94 and grid 92. One T network comprises a pair of resistors 96 and 97 with a capacitor connected between ground and the junction of resistors 96 and 97. The other T network comprises a pair of series capacitors 99 and 100 with a resistor 101 connected between ground and the junction of capacitors 99 and 100.

The filter network 91 functions to highly attenuate signals of the operating frequency, while transmitting signals of other frequencies. Signals of frequencies other than the operating frequency are thus applied to the control grid 92 of the triode 74 and are of such phase as to produce degenerative action in the cathode circuit of the triode 73, thus the amplification of signals of frequencies other than the operating frequency is greatly reduced.

Accordingly, a filter circuit is used which attenuates signals of the desired frequency, but in a manner to cause amplification of such signals to the exclusion of signals of other frequencies. An advantage of this system is that the network may comprise only resistances and capacitances which are relatively inexpensive and readily used.

It should be noted that this filtering system is quite important in minimizing the effects of harmonics, which can lead to appreciable errors in the measurement of eccentricity. It may also be noted that it might appear to be necessary to filter out harmonics prior to combining the signals to obtain the square root of the sum of the squares. It is found, however, that it makes no difference whether the filter is introduced ahead of the phase shifting system or following the adding circuit. By using the illustrated circuit, only one filter network is required.

Referring to FIGURES 3 and 4, reference numeral 102 designates a coil form used in a preferred construction of the coil assembly 18. The form 102 is constructed from a cylindrical member of insulating material, by cutting four axially extending side slots 103—106 in equi-angularly spaced relation, with a pair of intersecting slots 107 and 108 being cut in each end face to join the side slots. The coil 45 may be wound in slots 103, 105 and 108, while the coil 46 may be wound in the slots 104, 106 and 107.

A preferred winding method is illustrated diagrammatically in FIGURE 5. A layer 109 of coil 45 is first wound on the coil form, for example in slots 103, 105 and 108. A first layer 110 of the other coil 46 is then wound on the form, for example in the slots 104, 106 and 107. A second layer 111 of the coil 45 is then wound, after which a second layer 112 of the coil 46 is wound. This process is continued until the required number of turns are obtained for each coil. Thus the layers of the two coils are interlaced.

It is found that this winding arrangement gives highly satisfactory results. In case any adjustment is required, it can be readily accomplished by adding or subtracting turns from the last coil layer.

By way of illustrative example, and not by way of limitation, the coil form 102 may be constructed from a cylinder of insulating material having a diameter of 2" and a length of 2" with the slots having a width of 9/16" and a depth of approximately 3/8". Each coil may comprise 10 layers of 60 turns each of No. 32 enamel coated wire.

In the circuit of FIGURE 2, the components may have the following values.

| Reference numeral: | | Value |
|---|---|---|
| 50 | ohms | 9,750 |
| 51 | microfarads | 0.265 |
| 52 | do | 0.265 |
| 53 | ohms | 8,500 |
| 54 | do | 100,000 |
| 55 | microfarads | 0.034 |
| 60 | ohms | 150,000 |
| 61 | do | 150,000 |
| 64 | do | 2,100 |
| 65 | do | 2,100 |
| 68 | do | 100 |
| 69 | do | 100 |
| 71 | do | 50,000 |
| 77 | microfarads | 0.05 |
| 78 | ohms | 820,000 |
| 79 | do | 2,200,000 |
| 83 | do | 5,100 |
| 84 | microfarads | 50 |
| 86 | ohms | 100,000 |
| 90 | do | 270,000 |
| 93 | microfarads | 0.25 |
| 95 | ohms | 470,000 |
| 96 | do | 100,000 |
| 97 | do | 217,000 |
| 98 | microfarads | 0.031 |
| 99 | do | 0.014 |
| 100 | do | 0.0268 |
| 101 | ohms | 65,500 |

The triodes 58 and 59 may each be one section of a type 12AY7 tube. The triodes 73, 74 and 75 may be each one-half section of a type 6SN7 tube.

It will be understood that modifications and variations may be effected without departing from the spirit and scope of the novel concepts of this invention.

We claim as our invention:

1. In a system for measuring eccentricity of a tube, means for passing alternating current longitudinally through the tube, a pair of field-measuring devices within the tube arranged for producing output signals respectively proportional to magnetic field components along mutually perpendicular axes in a plane transverse to the tube, and indicating means responsive to said output signals and arranged to produce an indication proportional to the square root of the sum of the squares thereof.

2. In a system for measuring eccentricity of a tube, means for passing an alternating current longitudinally through the tube, a pair of loop coils disposed within the tube in mutually perpendicular longitudinal planes, and indicating means connected to said coils and arranged to produce an output indication proportional to the square root of the sum of the squares of the output signals from said coils.

3. In a system for measuring eccentricity of a tube, means for passing an alternating current longitudinally through the tube, a pair of loop coils disposed within the tube in mutually perpendicular longitudinal planes, phase shifter means responsive to output signals from said coils and arranged to produce a 90° phase shift in one signal relative to the other, and adding circuit coupled to the output of said phase shifter means, and indicating means coupled to the output of said adding circuit.

4. In a system for measuring eccentricity of a tube, means for passing an alternating current longitudinally through the tube, a pair of loop coils disposed within the tube in mutually perpendicular longitudinal planes, indicating means connected to said coils and arranged to produce an output indication proportional to the square root of the sum of the squares of the output signals from said coils, each of said coils comprising a plurality of layers with the layers of the two coils being interlaced.

5. In a system for measuring eccentricity of a tube, means for passing an alternating current longitudinally through the tube, a pair of loop coils disposed within the tube in mutually perpendicular longitudinal planes, a first resistor and a first capacitor connected in series across the output from one of said coils, a second resistor and a second capacitor connected in series across the output from the other of said coils, a first amplifier device having an input connected across said first capacitor, a second amplifier device having an input connected across said second resistor, a common impedance connected to the outputs of both of said amplifier devices, an indicating device, and means for applying to said indicating device a signal derived from said common impedance.

6. In a system for measuring eccentricity of a tube having inner and outer generally cylindrical surfaces, an electrical supply source, means connecting said source to points of said tube spaced longitudinally apart a distance sufficient to produce within an intermediate portion of said tube a magnetic field at right angles to a plane through the axes of said inner and outer surfaces and proportional to the distance between said axes, a field responsive device disposed within the tube to produce an output signal proportional to the magnitude of said field, and indicating means responsive to said output signal to provide an indication of the distance between said axes of said inner and outer surfaces of the tube.

References Cited in the file of this patent

UNITED STATES PATENTS

| | | |
|---|---|---|
| 2,135,675 | Palmer | Nov. 8, 1938 |
| 2,220,563 | White | Nov. 5, 1940 |
| 2,351,201 | Gillis | June 13, 1944 |
| 2,684,464 | Hastings et al. | July 20, 1954 |
| 2,779,916 | Poole | Jan. 29, 1957 |
| 2,871,446 | Wann | Jan. 27, 1959 |

FOREIGN PATENTS

| | | |
|---|---|---|
| 296,303 | Great Britain | May 30, 1929 |
| 554,346 | Germany | July 8, 1932 |